US011856538B2

(12) United States Patent
Liu

(10) Patent No.: US 11,856,538 B2
(45) Date of Patent: Dec. 26, 2023

(54) METHOD AND APPARATUS FOR BROADCASTING CONFIGURATION INFORMATION OF SYNCHRONIZING SIGNAL BLOCK, AND METHOD AND APPARATUS FOR RECEIVING CONFIGURATION INFORMATION OF SYNCHRONIZING SIGNAL BLOCK

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 437 days.

(21) Appl. No.: 17/293,030

(22) PCT Filed: Nov. 15, 2018

(86) PCT No.: PCT/CN2018/115614
§ 371 (c)(1),
(2) Date: May 11, 2021

(87) PCT Pub. No.: WO2020/097846
PCT Pub. Date: May 22, 2020

(65) Prior Publication Data
US 2021/0410088 A1    Dec. 30, 2021

(51) Int. Cl.
*H04W 4/06* (2009.01)
*H04W 56/00* (2009.01)
*H04W 4/40* (2018.01)

(52) U.S. Cl.
CPC ........... *H04W 56/001* (2013.01); *H04W 4/06* (2013.01); *H04W 4/40* (2018.02)

(58) Field of Classification Search
CPC ....... H04W 56/001; H04W 4/06; H04W 4/40; H04W 48/10; H04W 92/18; H04J 11/0069
See application file for complete search history.

(56) References Cited

U.S. PATENT DOCUMENTS 11,115,943 B2 * 9/2021 Ko .......................... H04L 5/10
11,523,354 B2 * 12/2022 Akkarakaran .... H04W 56/0025
(Continued)

FOREIGN PATENT DOCUMENTS

| CN | 106664674 A | 5/2017 |
| CN | 106717080 A | 5/2017 |

(Continued)

OTHER PUBLICATIONS

Dahlman Erik et al: "SG NR The Next Generation Wireless Access Technology", Aug. 17, 2018 (Aug. 17, 2018), XP055775576 (Year: 2018).*

(Continued)

Primary Examiner — Yuwen Pan
Assistant Examiner — Swati Jain
(74) Attorney, Agent, or Firm — SYNCODA LLC; Feng Ma

(57) ABSTRACT

A method for broadcasting configuration information of a synchronizing signal block includes: the maximum number of synchronizing signal blocks that can be transmitted is determined; the number of bits of configuration information to be generated is determined according to a relationship between the maximum number and a first preset value, and the configuration information comprising said number of bits is generated, in which the configuration information is configured to indicate a synchronizing signal block required to be transmitted in the maximum number of synchronizing signal blocks, and the first preset value is positively corre- (Continued)

lated with the number of bits that can be transmitted by a physical sidelink broadcast channel; and the configuration information is broadcasted by means of the physical sidelink broadcast channel.

14 Claims, 11 Drawing Sheets

(56) References Cited

U.S. PATENT DOCUMENTS

| | | | |
|---|---|---|---|
| 11,570,765 B2* | 1/2023 | Chen | H04W 68/00 |
| 11,653,322 B2* | 5/2023 | Park | H04L 27/2613 370/329 |
| 2017/0013577 A1* | 1/2017 | Berggren | H04B 7/2656 |
| 2017/0188319 A1* | 6/2017 | Seo | H04W 56/001 |
| 2017/0188391 A1 | 6/2017 | Rajagopal et al. | |
| 2017/0272299 A1 | 9/2017 | Chae et al. | |
| 2017/0331670 A1 | 11/2017 | Parkvall | |
| 2018/0241605 A1* | 8/2018 | Luo | H04L 27/2617 |
| 2018/0242324 A1 | 8/2018 | Luo | |
| 2018/0287840 A1 | 10/2018 | Akkarakaran et al. | |
| 2018/0302182 A1* | 10/2018 | Ly | H04J 11/0076 |
| 2018/0302202 A1* | 10/2018 | Kim | H04L 5/0051 |
| 2018/0324753 A1* | 11/2018 | Islam | H04W 68/02 |
| 2019/0045469 A1* | 2/2019 | Zhang | H04W 84/00 |
| 2019/0116567 A1* | 4/2019 | Zhang | H04L 27/2607 |
| 2019/0174466 A1* | 6/2019 | Zhang | H04L 5/0057 |
| 2019/0394003 A1* | 12/2019 | Kim | H04L 5/0048 |
| 2019/0394736 A1 | 12/2019 | Huang | |
| 2020/0015182 A1* | 1/2020 | Yuan | H04W 56/005 |
| 2020/0015214 A1* | 1/2020 | Si | H04W 76/14 |
| 2020/0037270 A1* | 1/2020 | Seo | H04W 56/00 |
| 2020/0037327 A1 | 1/2020 | Luo | |
| 2020/0053670 A1* | 2/2020 | Jung | H04W 56/00 |
| 2020/0177341 A1* | 6/2020 | Li | H04W 72/21 |
| 2020/0229114 A1* | 7/2020 | Ryu | H04L 27/26025 |
| 2020/0245228 A1 | 7/2020 | Rune et al. | |
| 2020/0305152 A1* | 9/2020 | Yasukawa | H04W 92/18 |
| 2021/0127322 A1* | 4/2021 | Rune | H04W 48/10 |
| 2021/0153198 A1* | 5/2021 | Zhang | H04W 72/02 |
| 2021/0168574 A1* | 6/2021 | Zhang | H04W 8/005 |
| 2021/0234663 A1* | 7/2021 | Kim | H04W 56/0015 |
| 2021/0306964 A1* | 9/2021 | Yuan | H04L 5/0094 |
| 2021/0321348 A1* | 10/2021 | Ohara | H04W 72/30 |
| 2022/0086607 A1* | 3/2022 | Ali | H04W 4/40 |
| 2022/0232501 A1* | 7/2022 | Lee | H04W 72/04 |
| 2022/0393846 A1* | 12/2022 | Jiao | H04L 5/1469 |

FOREIGN PATENT DOCUMENTS

| | | | |
|---|---|---|---|
| CN | 107046461 A | 8/2017 | |
| CN | 107211235 A | 9/2017 | |
| CN | 107852686 A | 3/2018 | |
| CN | 108024337 A | 5/2018 | |
| CN | 108141340 A | 6/2018 | |
| CN | 108235435 A | 6/2018 | |
| CN | 108401526 A | 8/2018 | |
| CN | 108496321 A | 9/2018 | |
| CN | 108496397 A | 9/2018 | |
| CN | 108632985 A | 10/2018 | |
| CN | 108702700 A | 10/2018 | |
| CN | 108781436 A | 11/2018 | |
| CN | 108809568 A | 11/2018 | |
| CN | 108811120 A | 11/2018 | |
| EP | 3293901 A4 | 4/2018 | |
| EP | 4184878 A1 * | 5/2023 | H04J 11/0073 |
| JP | 2020511024 A | 4/2020 | |
| JP | 2020519104 A | 6/2020 | |
| KR | 20180108377 A | 10/2018 | |
| RU | 2625816 C1 | 7/2017 | |
| WO | 2015111908 A1 | 7/2015 | |
| WO | 2016163809 A1 | 10/2016 | |
| WO | 2017171521 A1 | 10/2017 | |
| WO | 2018062980 A1 | 4/2018 | |
| WO | 2018070845 A1 | 4/2018 | |
| WO | 2018142309 A1 | 8/2018 | |
| WO | WO-2018142309 A1 * | 8/2018 | H04B 7/0689 |
| WO | 2018187093 A1 | 10/2018 | |
| WO | 2018191011 A1 | 10/2018 | |
| WO | 2018202032 A1 | 11/2018 | |
| WO | 2018204849 A1 | 11/2018 | |
| WO | WO-2018204849 A1 * | 11/2018 | H04W 48/12 |
| WO | WO-2023070040 A1 * | 4/2023 | H04W 24/10 |

OTHER PUBLICATIONS

International Search Report in the international application No. PCT/CN2018/115614, dated Aug. 14, 2019.
First Office Action of the Chinese application No. 201880002575.3, dated Dec. 28, 2020.
"Consideration on the NR system Information structure", 3GPP TSG-RAN WG2 Meeting#AH1801 R2-1800450, ZTE Corporation, Sanechips, Jan. 11, 2018.
"Discussion on physical layer structures and procedure(s) of NR sidelink", 3GPP TSG RAN WG1 Meeting #94 R1-1808647, Panasonic, Aug. 9, 2018.
English translation of the Written Opinion of the International Search Authority in the international application No. PCT/CN2018/115614, dated Aug. 14, 2019.
Xiaomi, "On Synchronization for NR V2X", 3GPP TSG RAN WG1 Meeting #95 R1-1813289, Spokane, USA, Nov. 12-16, 2018.
NTT DOCOMO, Inc. "[D004] ssb-PositionsInBurst in ServingCellConfigCommonSIB", 3GPP TSG RAN WG2 Meeting NR-AH#1807 R2-1809896, Montreal, Canada, Jul. 2-6, 2018.
First Office Action of the Japanese application No. 2021-526543, dated May 2, 2022.
First Office Action of the Korean application No. 10-2021-7016919, dated Jun. 29, 2022.
Notice of Allowance of the Chinese application No. 201880002575.3, dated Jun. 3, 2021.
Dahlman Erik et al: "5G NR The Next Generation Wireless Access Technology", Aug. 17, 2018 (Aug. 17, 2018), XP055775576, ISBN: 978-0-12-814323-0 Retrieved from the Internet:URL: https://www.gbv.de/dms/ilmenau/toc/1736857436. PDF [retrieved on Feb. 12, 2021]* Chapter 16;p. 311-p. 322 * * Chapter 20.5;p. 411 *.
Supplementary European Search Report in the European application No. 18940452.8, dated Oct. 19, 2021.
Fujitsu, "NR-PBCH design", vol. RAN WG1, No. Hangzhou, China; Apr. 15, 2017-Apr. 19, 2017, Agenda Item: 7.1.1.2.1, 3GPP Draft; R1-1707253, https://www.3gpp.org/ftp/tsg_ran/WG1_RL1/TSGR1_89/Docs , May 5, 2017.
Qualcomm Incorporated, "SS burst set composition consideration", vol. RAN WG1, No. Qingdao, P.R. China; Jun. 27, 2017-Jun. 30, 2017, Agenda Item: 5.1.1.1.2, 3GPP Draft; R1-1711645, https://www.3gpp.org/ftp/TSG_RAN/WG1_RL1/TSGR1_AH/NR_AH_1706/Docs , Jun. 27, 2017.
First Office Action of the Russian application No. 2021116977, dated Dec. 27, 2021.

* cited by examiner

METHOD AND APPARATUS FOR BROADCASTING CONFIGURATION INFORMATION OF SYNCHRONIZING SIGNAL BLOCK, AND METHOD AND APPARATUS FOR RECEIVING CONFIGURATION INFORMATION OF SYNCHRONIZING SIGNAL BLOCK

CROSS-REFERENCE TO RELATED APPLICATIONS

This is a U.S. national stage of international application No. PCT/CN2018/115614 filed on Nov. 15, 2018, the disclosure of which is hereby incorporated by reference in its entirety.

BACKGROUND

In the $5^{th}$ Generation (5G) New Radio (NR) technology, a base station transmits the configuration information through a RMSI (Remaining Minimum System Information) to indicate the transmission of an SSB.

However, in certain communication scenarios, such as in a scenario of the sidelink communication in Vehicle to Everything (V2X), both communication parties do not transmit RSMI, which will affect the transmission of the configuration information above.

SUMMARY

The present disclosure relates to the field of communication technologies, and more particularly, to a method for broadcasting configuration information of a Synchronizing Signal Block (SSB), a method for receiving configuration information of an SSB, a device for broadcasting configuration information of an SSB, a device for receiving configuration information of an SSB, an electronic device, and a computer readable storage medium.

According to a first aspect of an embodiment of the present disclosure, there is provided a method for broadcasting configuration information of an SSB, applied to sidelink communication, the method includes:

determining, according to a frequency band for transmitting an SSB, a maximum number of SSBs that can be transmitted;

determining, according to a relationship between the maximum number and a first preset number, a number of bits of the configuration information to be generated, generating configuration information including the number of bits, herein the configuration information is used to indicate an SSB to be transmitted in the maximum number of SSBs, and the first preset number is positively correlated to the number of bits that can be transmitted by the physical sidelink broadcast channel; and broadcasting configuration information through a physical sidelink broadcast channel.

According to a second aspect of an embodiment of the present disclosure, there is provided a method for receiving configuration information of an SSB, applied to the sidelink communication, the method includes:

determining, according to a frequency band for receiving an SSB, a maximum number of SSBs;

determining, according to a physical sidelink broadcast channel in which an SSB is received in the frequency band, a first preset number, herein the first preset number, positively correlated to a number of bits that can be transmitted by the physical sidelink broadcast channel;

determining, according to a relationship between the maximum number and the first preset number, a number of bits of configuration information to be received, herein the configuration information is used to indicate an SSB to be received in the maximum number of SSBs;

receiving the configuration information through the physical sidelink broadcast channel;

determining, according to the number of bits, a parameter based on which the configuration information is parsed;

parsing the configuration information based on the parameter.

According to a third aspect of an embodiment of the present disclosure, there is provided a device for broadcasting configuration information of an SSB, applied to sidelink communication, the device including:

a number determining module, configured to determine, according to a frequency band for transmitting an SSB, a maximum number of SSBs that can be transmitted;

a bit number determining module, configured to determine, according to a relationship between the maximum number and a first preset number, a number of bits of configuration information to be generated;

an information generation module, configured to generate configuration information including the number of bits, herein the configuration information is used to indicate an SSB to be transmitted of the maximum number of SSBs, and the first preset number is positively correlated to the number of bits that can be transmitted by the physical sidelink broadcast channel;

a broadcasting module, configured to broadcast the configuration information through a physical sidelink broadcast channel.

According to a fourth aspect of an embodiment of the present disclosure, there is provided a device for receiving configuration information of an SSB, applied to the sidelink communication. The device includes:

a number determining module, configured to, according to a frequency band for receiving an SSB, determine a maximum number of SSBs that can be received;

a value determining module, configured to, according to a physical sidelink broadcast channel in which an SSB is received in the frequency band, determine a first preset number, herein the first preset number is positively correlated to a number of bits that can be transmitted by the physical sidelink broadcast channel;

a bit number determining module, configured to, according to a relationship between the maximum number and the first preset number, determine a number of bits of configuration information to be received, herein the configuration information is used to indicate an SSB to be received in the maximum number of SSBs;

a receiving module, configured to receive the configuration information through a physical sidelink broadcast channel;

a parameter determining module, configured to, according to the number of bits, determine a parameter based on which the configuration information is parsed;

a parsing module, configured to parse the configuration information based on the parameter.

According to a fifth aspect of an embodiment of the present disclosure, there is provided an electronic device including:

a processor;

a memory for storing instructions executable by the processor.

Herein the processor is configured to implement the steps of the method for broadcasting the configuration information of the SSB according to any one of the above embodiments.

According to a sixth aspect of an embodiment of the present disclosure, there is provided an electronic device including:

a processor;

a memory for storing instructions executable by the processor.

Herein the processor is configured to implement the steps of the method for receiving the configuration information of the SSB according to any one of the above embodiments.

According to a seventh aspect of the embodiments of the present disclosure, there is provided a computer readable storage medium having stored therein a computer program that, when executed by a processor, cause the processor to implement the steps of the method for broadcasting the configuration information of an SSB according to any one of the above-described embodiments.

According to an eighth aspect of an embodiment of the present disclosure, there is provided a computer readable storage medium having stored therein a computer program that, when executed by a processor, cause the processor to implement the steps of the method for receiving the configuration information of an SSB according to any one of the above-described embodiments.

BRIEF DESCRIPTION OF THE DRAWINGS

In order to explain the technical solution in the embodiments of the present application more clearly, reference will now be made briefly to the accompanying drawings required for the description of the embodiments. It will be apparent that the accompanying drawings in the following description are merely some of the embodiments of the present disclosure, and other accompanying drawings may be obtained to those skilled in the art without involving any inventive effort.

DETAILED DESCRIPTION

The technical solutions in the embodiments of the present disclosure will be clearly and completely described below with the reference of the accompanying drawings in the embodiments of the present disclosure. It will be apparent that the described embodiments are merely a part of the embodiments, rather than all the embodiments of the present disclosure. Based on the embodiments in the present disclosure, all other embodiments obtained by those skilled in the art without involving any inventive effort fall within the scope of the present disclosure.

Figure 1:
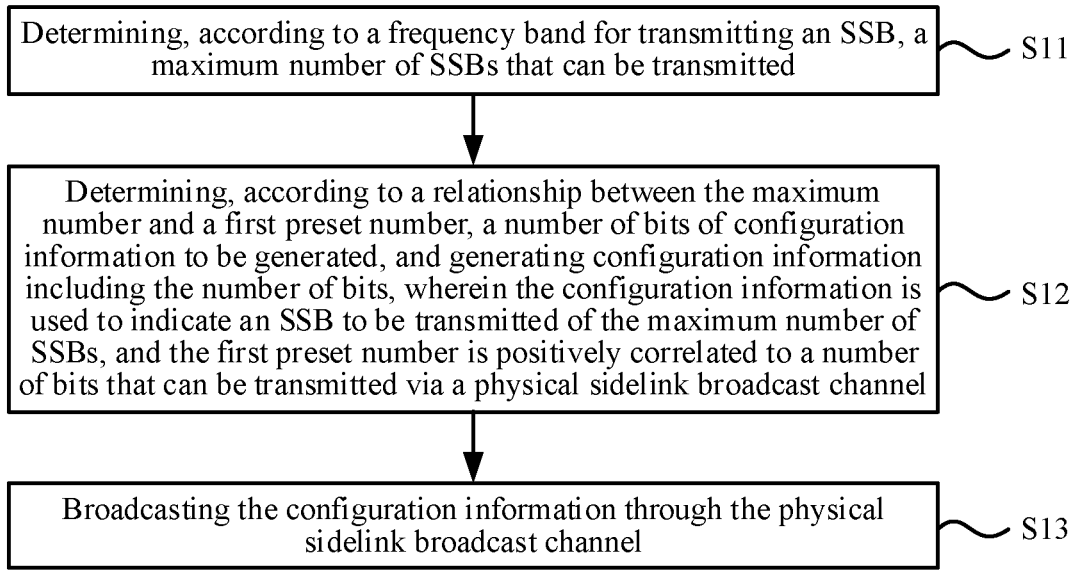
FIG. 1 is a schematic flowchart illustrating a method for broadcasting configuration information of an SSB according to an embodiment of the present disclosure.

FIG. 1 is a schematic flowchart illustrating a method for broadcasting configuration information of an SSB according to an embodiment of the present disclosure. The method for broadcasting the configuration information of the SSB shown in the present embodiment may be applied to a device capable of serving as a base station in sidelink communication, for example, a vehicle capable of emulating a base station to transmit a signal through a beam. This vehicle may communicate with other vehicles based on the 5G NR technology.

As shown in FIG. 1, the method for broadcasting the configuration information of the SSB may include the following steps.

In step S11, the maximum number of the SSBs that can be transmitted is determined according to the frequency band of the transmission SSB;

In step S12, the number of bits of configuration information to be generated is determined according to the relationship between the maximum number and a first preset number, and the configuration information including the number of bits is generated. Herein the configuration information is used to indicate an SSB to be transmitted in the maximum number of SSBs, and the first preset number is positively correlated to the number of bits that can be transmitted by the physical sidelink broadcast channel.

In step S13, the configuration information is broadcasted through a physical sidelink broadcast channel.

The present embodiment may be applied to a scenario of Vehicle to Everything, in which a vehicle can communicate with other vehicles, in-vehicle equipment, and roadside equipment. For example, a vehicle A can receive a signal transmitted by a base station, while a vehicle B cannot receive a signal transmitted by a base station for some reason (for example, outside the coverage area of the base station). However, the vehicle B can receive a signal transmitted by the vehicle A as the vehicle A is relatively close to the vehicle B. Then, the vehicle A can first communicate with the base station, receive the information transmitted by the base station, and then emulate the base station to transmit a signal transmitted through a beam, so that the vehicle B can receive the signal transmitted by the vehicle A, and further obtain the information transmitted by the base station based on the signal transmitted by the vehicle A. The communication between the vehicle A and the vehicle B is not performed through the base station, but based on a sidelink. In this communication process, the vehicle A serves as a base station and the vehicle B serves as a user equipment. The method shown in this embodiment can be applied to the vehicle A.

Because the RMSI is not transmitted through the sidelink communication, unlike the communication between a base station and a user equipment, embodiments of the present disclosure may broadcast the configuration information through a Physical Sidelink Broadcast Channel (PSBCH).

The more bits of the configuration information, the more accurate the content that can be expressed. For example, the maximum number of SSBs that can be transmitted is L (L can be equal to 4, 8, 64, etc.), that is, the maximum number of SSBs that can be transmitted is L. However, there may be a case in which some SSBs do not need to be transmitted. When the number of bits of the configuration information is L, whether each of the L SSBs is an SSB to be transmitted may be accurately indicated by the configuration information.

Considering that the number of bits that can be transmitted through the physical sidelink broadcast channel is relatively limited, and the number of bits that can be transmitted does not necessarily reach the maximum number L of the SSBs that can be transmitted, it is necessary to appropriately adjust the number of bits of the configuration information.

According to the present embodiment, the maximum number L of the SSBs that can be transmitted can be determined according to the frequency band of the transmission SSB. As the center frequency of the frequency band is increased, the transmission of the signal through the frequency band is more easily blocked. Therefore, a larger number of SSBs need to be transmitted to overcome the influence of the blocking. Therefore, the higher the center frequency of the frequency band, the larger the value of L, and the lower the center frequency of the frequency band, the smaller the value of L. The number of bits of the configuration information to be generated is then determined according to the relationship between the maximum number and the first preset number K. Herein the first preset number is positively correlated to the number of bits that can be transmitted through the physical sidelink broadcast channel. That is, a larger bit number can be transmitted through a physical sidelink broadcast channel, the first preset number is larger, and a smaller bit number can be transmitted through a physical sidelink broadcast channel, the first preset number is smaller.

For example, the maximum value of the number of bits that can be transmitted by the physical sidelink broadcast channel may be selected as the first preset number, or a value smaller than the maximum value of the number of bits that can be transmitted through the physical sidelink broadcast channel may be selected as the first preset number. In this case, the first preset number may be an upper limit value of the number of bits that can be used to transmit the configuration information in the physical sidelink broadcast channel, and other bits in the physical sidelink broadcast channel is used to transmit the content other than the configuration information.

For example, the maximum value of the number of bits that can be transmitted by the physical sidelink broadcast channel is used as the first preset number. If the maximum number L of the SSBs that can be transmitted is less than or equal to the first preset number K, it indicates that the L bits of configuration information can be transmitted through the physical sidelink broadcast channel. Then the configuration information whose bit number is L can be generated, so as to accurately indicate whether each of the L SSBs is an SSB to be transmitted. If the maximum number L of the SSBs that can be transmitted is larger than the first preset number K, it indicates that it is insufficient to transmit the L bits of configuration information through the physical sidelink broadcast channel, and the number of bits of the generated configuration information needs to be smaller than L to ensure the smooth transmission of the configuration information through the physical sidelink broadcast channel.

According to an embodiment of the present disclosure, in a scenario of sidelink communication, the configuration information may be broadcasted through a physical sidelink broadcast channel, the number of bits of the configuration information to be generated may be determined according to a relationship between the maximum number and a first preset number, and the configuration information including the number of bits is generated to ensure the smooth transmission of the configuration information through the physical sidelink broadcast channel.

Figure 2:
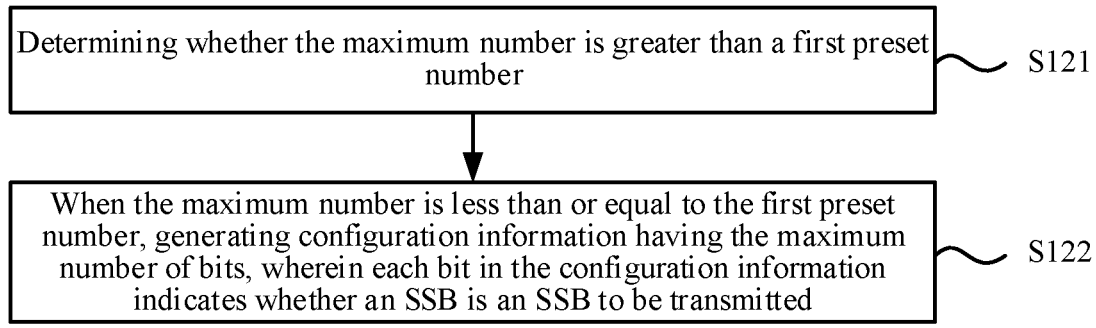
FIG. 2 is a schematic flowchart illustrating of determining a number of bits of the configuration information according to a relationship between the maximum number and a first preset number, and generating the configuration information including the number of bits, according to an embodiment of the present disclosure.

FIG. 2 is a schematic flowchart illustrating of determining a number of bits of the configuration information according to a relationship between the maximum number and a first preset number, and generating the configuration information including the number of bits, according to an embodiment of the present disclosure. As illustrated in FIG. 2, determining a number of bits of the configuration information according to the relationship between the maximum number and the first preset number, and generating the configuration information including the number of bits includes steps S121 and S122.

In step S121, it is determined whether the maximum number is greater than the first preset number.

In step S122, when the maximum number is less than or equal to the first preset number, the configuration information having the maximum number of bits is generated. Herein each bit in the configuration information indicates whether an SSB is an SSB to be transmitted.

In an embodiment, taking, as an example, the maximum value of the number of bits that can be transmitted by the physical sidelink broadcast channel is selected as the first preset number K, when the maximum number L is less than or equal to the first preset number K, it indicates that the maximum number L of bits of configuration information can be transmitted through the physical sidelink broadcast channel. Then the configuration information whose bit number is L can be generated, so as to accurately indicate whether each of the L SSBs is an SSB to be transmitted.

According to an embodiment of the present disclosure, in a scenario of the sidelink communication, the configuration information may be broadcasted through a physical sidelink broadcast channel, the number of bits of the configuration information to be generated may be determined according to a relationship between the maximum number and the first preset number, and the configuration information including the number of bits is generated to ensure the smooth transmission of the configuration information through the physical sidelink broadcast channel.

Figure 3:
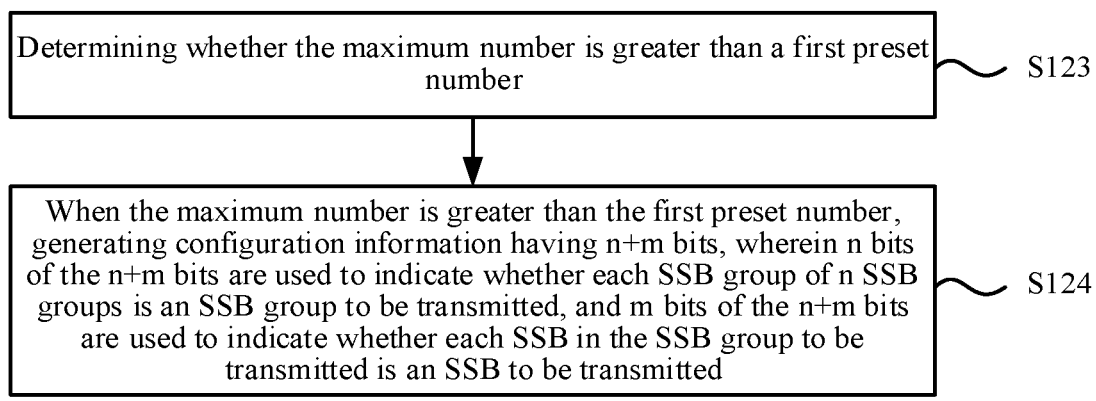
FIG. 3 is another schematic flowchart illustrating of determining a number of bits of the configuration information according to a relationship between the maximum number and a first preset number, and generating the configuration information including the number of bits according to an embodiment of the present disclosure.

FIG. 3 is another schematic flowchart illustrating of determining a number of bits of the configuration information according to a relationship between the maximum number and the first preset number, and generating the configuration information including the number of bits, according to an embodiment of the present disclosure. As illustrated in FIG. 3, the maximum number of the SSBs includes n SSB groups, and each SSB group includes m SSBs. Herein m and n are positive integers, determining, according to the relationship between the maximum number and the first preset number, the number of bits of the configuration information, and generating the configuration information including the number of bits includes steps S123 and S124:

In step S123, it is determined whether the maximum number is greater than the first preset number.

In step S124, when the maximum number is greater than the first preset number, the configuration information having n+m bits is generated. Herein n bits of the n+m bits are used to indicate whether each of the n SSB groups is an SSB group to be transmitted, and m bits of the n+m bits are used to indicate whether each SSB in the SSB group to be transmitted is an SSB to be transmitted.

In an embodiment, taking, as an example, the maximum value of the number of bits that can be transmitted by the physical sidelink broadcast channel is selected as the first preset number, when the maximum number L is greater than the first preset number K, it indicates that it is insufficient to transmit L bits of configuration information through the physical sidelink broadcast channel. Then the number of bits of the generated configuration information needs to be less than L to ensure the smooth transmission of the configuration information through the physical sidelink broadcast channel, here L=m×n.

Meanwhile, it is also necessary to ensure that the configuration information transmitted through the physical sidelink broadcast channel can accurately express which signal blocks of the L signal blocks are signal blocks to be transmitted. Therefore, the present embodiment is mainly applied to a maximum number of SSBs including n SSB groups, and each SSB group includes m SSBs. When the transmission cases of the SSBs at the same positions in each SSB group are the same, whether each of the L SSBs is an SSB to be transmitted may be indicated by the n+m bits of configuration information.

Taking, as an example, L=64, m=8, and n=8, if some of the eight SSB groups may not be transmitted, 8 bits may be used to indicate whether each of the eight SSB groups is an SSB group to be transmitted. For example, the second and the seventh SSB groups are not transmitted, n bits are 10111101, and m bits are used to indicate whether each SSB in the SSB group to be transmitted is an SSB to be transmitted. For example, if the third and the fourth SSBs in each SSB group are not required to be transmitted, whether the SSBs in each SSB group that to be transmitted may be indicated by m bits, and the m bits are 11001111. Based on this, the transmission of 64 SSBs may be indicated by 16 bits, thereby reducing the number of bits of the configuration information transmitted through the physical sidelink broadcast channel.

Figure 4:
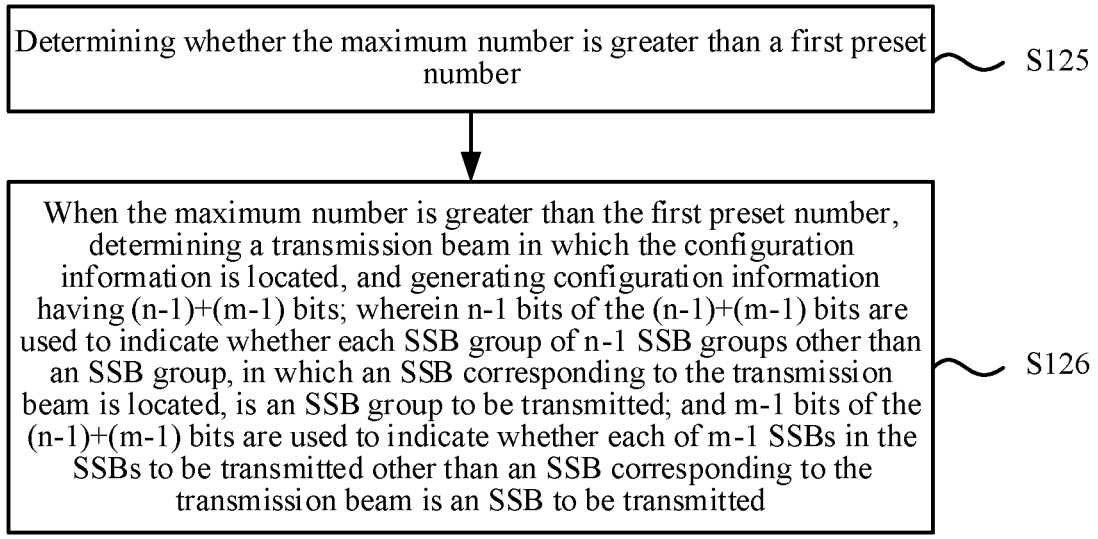
FIG. 4 is another schematic flowchart illustrating of determining a number of bits of configuration information according to a relationship between the maximum number and a first preset number, and generating configuration information including the number of bits according to an embodiment of the present disclosure.

FIG. 4 is another schematic flowchart illustrating of determining a number of bits of the configuration information according to a relationship between the maximum number and the first preset number, and generating configuration information including the number of bits, according to an embodiment of the present disclosure. As illustrated in FIG. 4, the maximum number of the SSBs includes n SSB groups, and each SSB group includes m SSBs. Herein m and n are positive integers, determining, according to the relationship between the maximum number and the first preset number, a number of bits of the configuration information, and generating the configuration information including the number of bits includes steps S125 and S126.

In step S125, it is determined whether the maximum number is greater than the first preset number.

In step S126, when the maximum number is greater than the first preset number, a transmission beam in which the configuration information is located is determined, and configuration information having (n−1)+(m−1) bits is generated. Herein n−1 bits of the (n−1)+(m−1) bits are used to indicate whether each SSB group of n−1 SSB groups other than the SSB group, in which the SSB corresponding to the transmission beam is located, is an SSB group to be transmitted, and m−1 bits of the (n−1)+(m−1) bits are used to indicate whether each of m−1 SSBs in the SSBs to be transmitted other than the SSB corresponding to the transmission beam is an SSB to be transmitted.

Although the number of bits of the configuration information transmitted through the physical sidelink broadcast channel can be reduced based on the embodiment illustrated in FIG. 3, it is further considered that the vehicle serving as the base station can determine the beam for transmitting the configuration information, i.e., the transmission beam in which the configuration information is located, and the vehicle serving as the user equipment can determine the beam for receiving the configuration information, i.e., the receiving beam in which the configuration information is located. Therefore, when the configuration information is transmitted, one bit can be omitted from the m bits. This bit is the transmission case of the target SSB corresponding to the beam in which the configuration information is transmitted. Since it is necessary to transmit the target SSB on this beam, this bit must be 1. Therefore, it is only necessary to transmit other m−1 bits to indicate whether the SSB other than the target SSB needs to be transmitted.

Further, since the target SSB is transmitted, the target SSB group in which the target SSB is located is also transmitted. Therefore, the corresponding bit of the target SSB group among the n bits is also necessarily 1. Therefore, one bit of the n bits can be omitted, and only other n−1 bits need to be transmitted to indicate whether the SSB groups other than the target SSB group needs to be transmitted.

According to the present embodiment, based on the embodiment illustrated in FIG. 3, the number of bits of the configuration information transmitted through the physical sidelink broadcast channel can be further reduced, thereby reducing the occupation of the physical sidelink broadcast channel.

Figure 5:
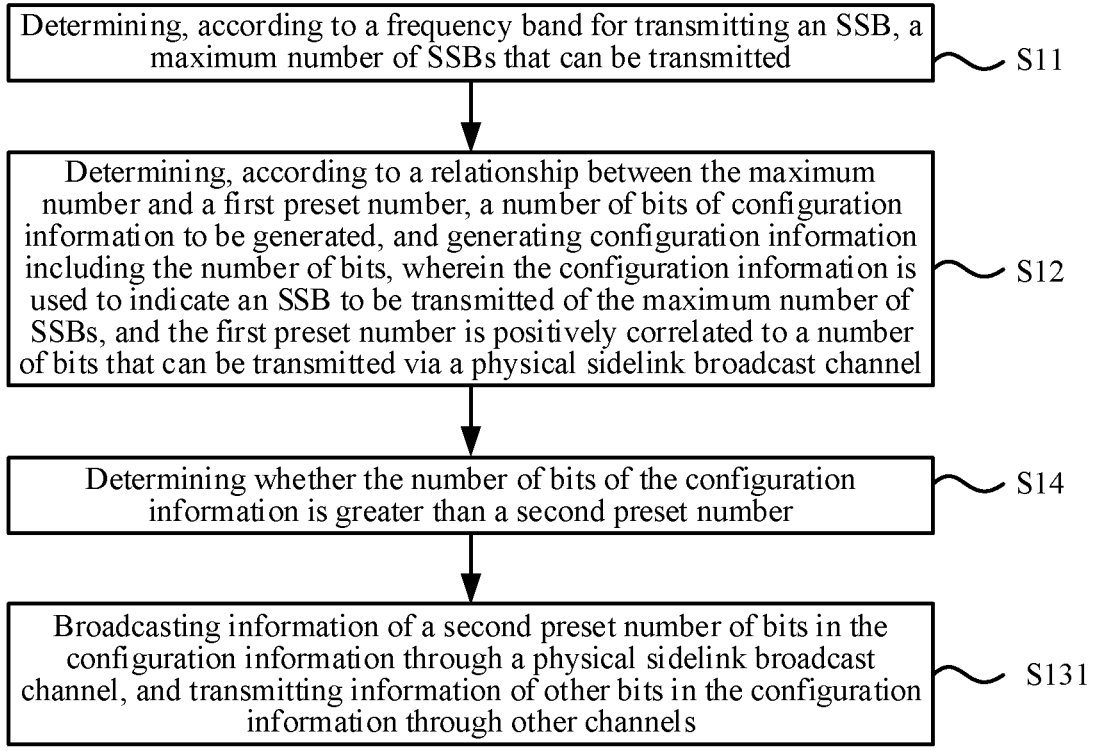
FIG. 5 is a schematic flowchart illustrating another method for broadcasting configuration information of an SSB according to an embodiment of the present disclosure.

FIG. 5 is a schematic flowchart illustrating another method for broadcasting configuration information of SSB according to an embodiment of the present disclosure. As illustrated in FIG. 5, the method further includes the following steps.

In step S14, before broadcasting the configuration information through the physical sidelink broadcast channel, it is determined whether the number of bits of the configuration information is greater than a second preset number.

When the number of bits of the configuration information is greater than a second preset number, broadcasting the configuration information through the physical sidelink broadcast channel includes step S131.

In step S131, the information of a second preset number of bits in the configuration information is broadcasted through a physical sidelink broadcast channel, and the information of other bits in the configuration information is transmitted through other channels.

In an embodiment, the second preset number may be a value smaller than the maximum value of the number of bits that can be transmitted by the physical sidelink broadcast channel, and the second preset number may be an upper limit value of the number of bits that can be used to transmit the configuration information in the physical sidelink broadcast channel In this case, other bits in the physical sidelink broadcast channel needs to transmit the content other than the configuration information. If the number of bits of the configuration information is larger than the second preset number, it is insufficient to transmit the configuration information through the physical sidelink broadcast channel only. Therefore, the information of the second preset number of bits in the configuration information can be broadcasted through the physical sidelink broadcast channel, and the information of other bits in the configuration information is transmitted through other channels to ensure that the configuration information can be smoothly transmitted.

Optionally, the SSBs in the SSB group correspond to the beams one by one.

Optionally, multiple SSBs in the SSB group correspond to the same beam.

In an embodiment, in addition to the situation that the SSBs correspond to the beams one by one, there is also a situation that multiple SSBs correspond to the same beam. In this situation, since a beam can transmit multiple SSBs (not transmitting simultaneously, but transmitting at different times), and only one SSB can be transmitted at the same time), the number of bits of the configuration information is related to the beam, that is, the number of bits of the configuration information needs to be generated is determined according to the relationship between the number of beams corresponding to the maximum number and the first preset number.

For example, if the maximum number of the SSBs that can be transmitted is L=8, and the number of beams that can be transmitted is $B_n$=4, that is, each beam can transmit two SSBs, the number of bits of the configuration information is determined based on $B_n$. The determining manner is the same as in the foregoing embodiment. For example, if $B_n$ is less than or equal to K, the configuration information whose bit number is $B_n$ is generated.

Figure 6:
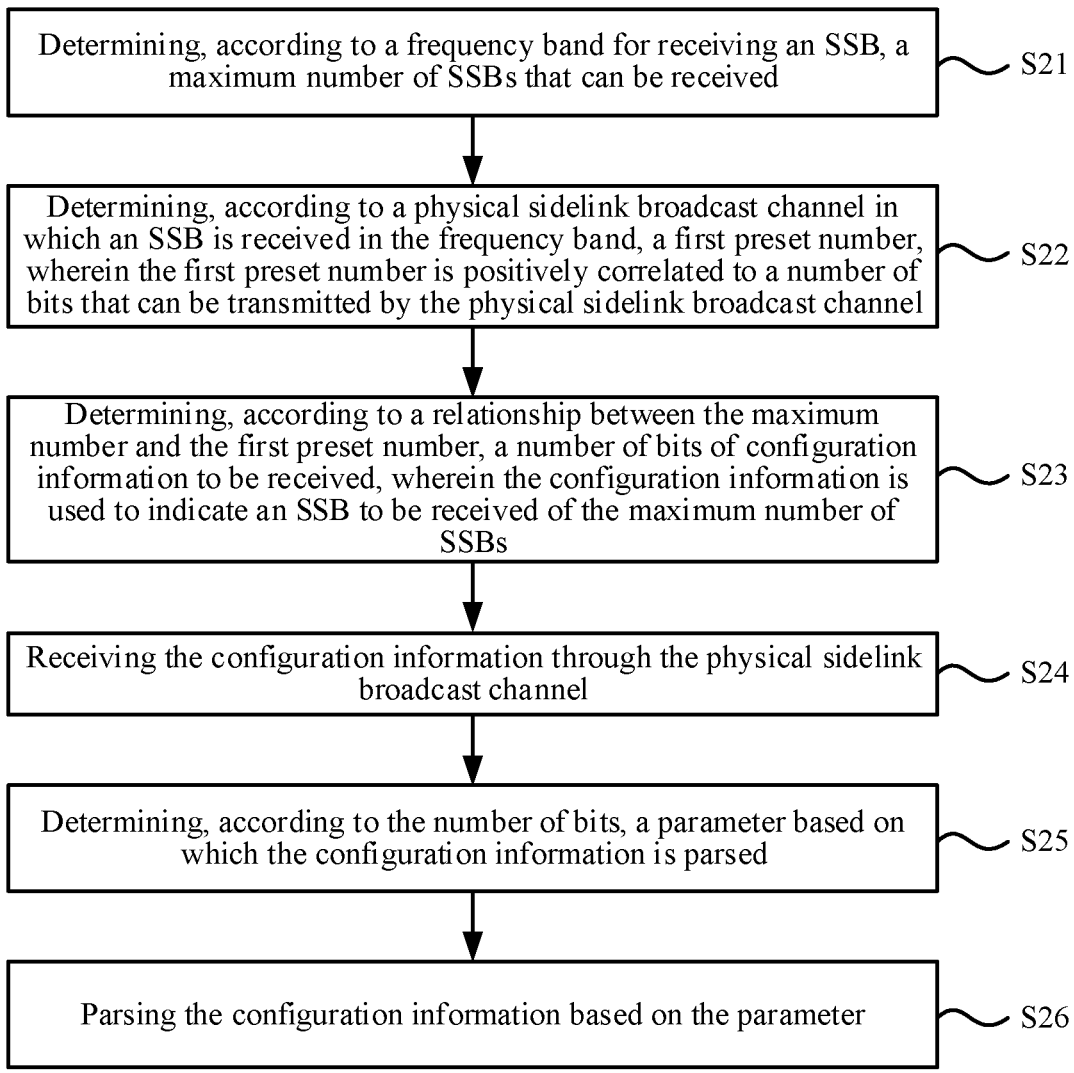
FIG. 6 is a schematic flowchart illustrating a method for receiving configuration information of an SSB according to an embodiment of the present disclosure.

FIG. 6 is a schematic flowchart illustrating a method for receiving configuration information of an SSB according to an embodiment of the present disclosure. The method for receiving the configuration information of the SSB shown in present embodiment may be applied to a device capable of serving as a user equipment in sidelink communication. For example, a vehicle, communicating with the vehicle serving as a base station in the embodiment illustrated in FIG. 1, may receive the information broadcasted by the vehicle serving as a base station in the embodiment illustrated in FIG. 1 based on the 5G NR technology.

As illustrated in FIG. 6, the method for receiving the configuration information of the SSB may include the steps S21 to S26.

In step S21, the maximum number of the SSBs that can be received is determined according to the frequency band for receiving the SSB.

In step S22, the first preset number is determined according to the physical sidelink broadcast channel in which the SSB is received in the frequency band. Herein the first preset number is positively correlated to the number of bits that can be transmitted by the physical sidelink broadcast channel.

In step S23, the number of bits of the configuration information to be received is determined according to the relationship between the maximum number and the first preset number. Herein the configuration information is used to indicate an SSB to be received in the maximum number of SSBs.

In step S24, the configuration information is received through a physical sidelink broadcast channel.

In step S25, a parameter based on which the configuration information is parsed is determined according to the number of bits.

In step S26, the configuration information is parsed based on the parameter.

In an embodiment, the method shown in present embodiment may be applied to a vehicle serving as a user equipment, for example, to a vehicle B corresponding to the embodiment illustrated in FIG. 1.

Since the vehicle receiving the configuration information can determine the frequency band in which the configuration information is received, the maximum number of the received SSBs can be determined. It is also possible to determine a physical sidelink broadcast channel for receiving an SSB, and determine a maximum number L of the SSBs that can be received by the physical sidelink broadcast channel. Then the first preset number K is determined according to the physical sidelink broadcast channel in which the SSB is received in the frequency band, and the number of bits of the configuration information to be received is determined according to a relationship between the maximum number L and the first preset number K.

According to the number of bits of the received configuration information, the vehicle determines the parameter in the algorithm for parsing the configuration information, further parses the configuration information, and determines the transmission condition of the SSB according to the configuration information, so as to receive the SSB.

Figure 7:
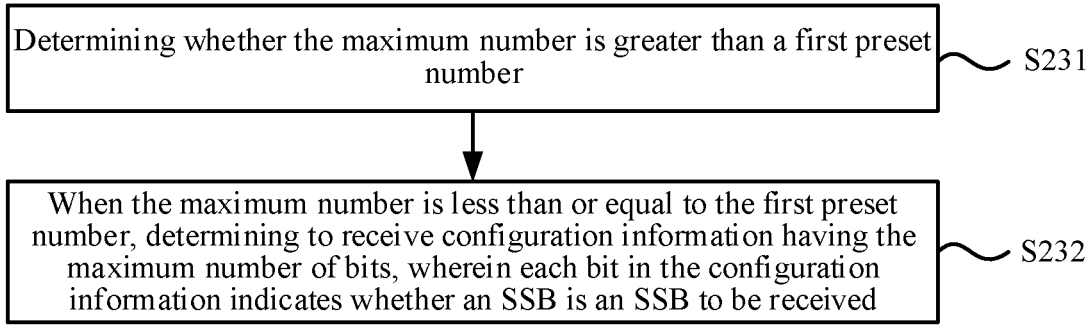
FIG. 7 is a schematic flowchart illustrating of determining a bit number of receiving configuration information according to a relationship between the maximum number and a first preset number according to an embodiment of the present disclosure.

FIG. 7 is a schematic flow diagram illustrating of determining a bit number of receiving configuration information according to a relationship between the maximum number and the first preset number according to an embodiment of the present disclosure. As illustrated in FIG. 7, determining, according to the relationship between the maximum number and the first preset number, the number of bits of receiving the configuration information includes steps S231 and S232.

In step S231, it is determined whether the maximum number is greater than the first preset number.

In step S232, when the maximum number is less than or equal to the first preset number, it is determined to receive the configuration information having the maximum number of bits. Herein each bit in the configuration information indicates whether an SSB is an SSB to be received.

In an embodiment, corresponding to the embodiment illustrated in FIG. 2, if the maximum number L is less than or equal to the first preset number K, it indicates that the maximum number L of bits of configuration information can be received through the physical sidelink broadcast channel. That is, the vehicle serving as the base station can transmit the maximum number L of bits of configuration information through the physical sidelink broadcast channel. Then it is determined to receive the configuration information whose bit number is L.

Figure 8:
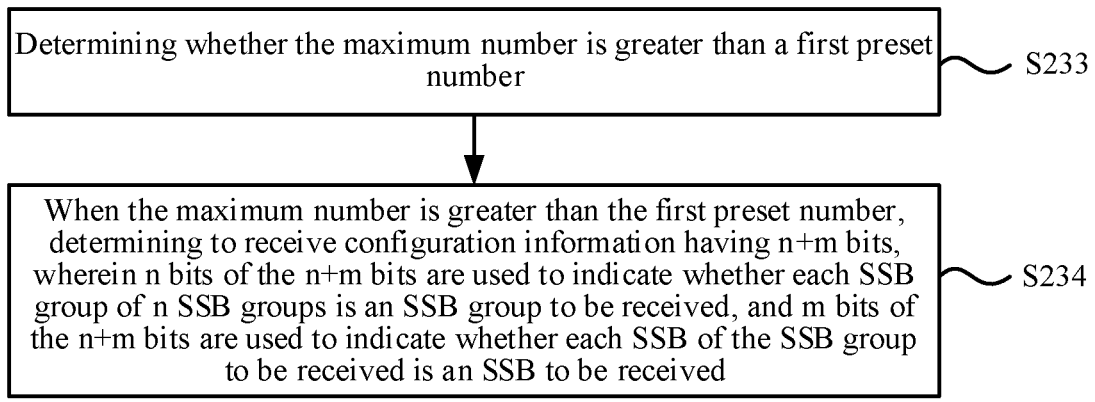
FIG. 8 is another schematic flowchart illustrating of determining the number of bits of receiving configuration information according to the relationship between the maximum number and the first preset number according to an embodiment of the present disclosure.

FIG. 8 is another schematic flowchart illustrating of determining the number of bits of receiving configuration information according to the relationship between the maximum number and the first preset number according to an embodiment of the present disclosure. As illustrated in FIG. 8, the maximum number of the SSBs includes n SSB groups, and each SSB group includes m SSBs. Herein m and n are positive integers, and determining, according to the relationship between the maximum number and the first preset number, the number of bits of receiving the configuration information includes steps S233 and S234.

In step S233, it is determined whether the maximum number is greater than the first preset number.

In step S234, when the maximum number is greater than the first preset number, it is determined to receive the configuration information having n+m bits. Herein n bits of the n+m bits are used to indicate whether each of the n SSB groups is an SSB group to be received, and m bits of the n+m bits are used to indicate whether each SSB of the SSB group to be received is an SSB to be received.

In an embodiment, corresponding to the embodiment illustrated in FIG. 3, if the maximum number L is greater than the first preset number K, it indicates that it is insufficient to receive L bits of configuration information through the physical sidelink broadcast channel. That is, it is insufficient for the vehicle serving as the base station to transmit the maximum number L of bits of configuration information through the physical sidelink broadcast channel. The vehicle serving as the base station generates and transmits the configuration information whose bit number is less than L, and the number of bits of the received configuration information is also less than L, herein L=m×n.

Figure 9:
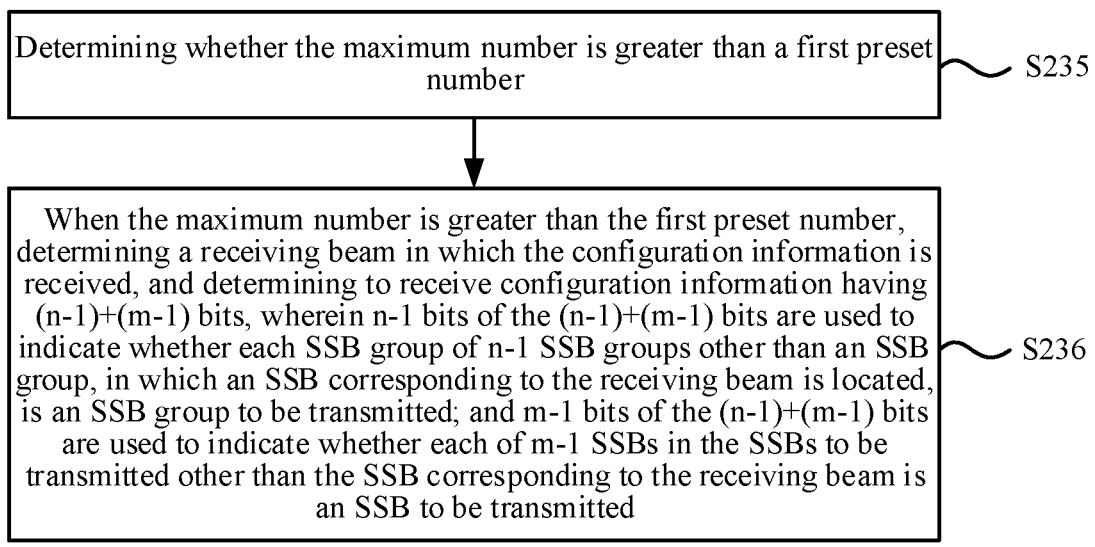
FIG. 9 is another schematic flowchart illustrating of determining the number of bits of receiving configuration information according to the relationship between the maximum number and the first preset number according to an embodiment of the present disclosure.

FIG. 9 is another schematic flowchart illustrating of determining the number of bits of receiving configuration information according to the relationship between the maximum number and the first preset number according to an embodiment of the present disclosure. As illustrated in FIG. 9, the maximum number of the SSBs includes n SSB groups, and each SSB group includes m SSBs. Herein m and n are positive integers, and determining the number of bits of the configuration information according to the relationship between the maximum number and the first preset number includes steps S235 and S236.

In step S235, it is determined whether the maximum number is greater than the first preset number.

In step S236, when the maximum number is greater than the first preset number, a receiving beam in which the configuration information is received is determined, and it is determined to receive the configuration information having (n−1)+(m−1) bits. Herein n−1 bits of the (n−1)+(m−1) bits are used to indicate whether each SSB group of n−1 SSB groups other than the SSB group, in which the SSB corresponding to the receiving beam is located, is an SSB group to be transmitted, and m−1 bits of the (n−1)+(m−1) bits are used to indicate whether each of m−1 SSBs in the SSBs to be transmitted other than the SSB corresponding to the receiving beam is an SSB to be transmitted.

In an embodiment, corresponding to the embodiment illustrated in FIG. 4, if the maximum number is greater than the first preset number, and the number of bits of the configuration information transmitted by the vehicle serving as the base station is (n−1)+(m−1), it can be determined that the number of bits of the received configuration information is also (n−1)+(m−1).

Further, when parsing the configuration information, since the receiving beam in which the configuration information is received is known (for example, it can be determined when a communication connection is established with a vehicle serving as a base station), it can be determined that the SSB corresponding to the receiving beam is necessarily received. The SSB is identified, and it can be determined, according to the SSB identification, that the SSB is which SSB of which group.

Taking, as an example, L=64, m=8, and n=8, and the SSB identification is from 0 to 63, it is determined that the identification of the SSB corresponding to the receiving beam is 7, that is, the eighth SSB in the first row is necessarily received. Based on this, the received configuration information having (n−1)+(m−1) bits can be complemented.

For example, in the case that the first n−1 bits indicate whether each of the (n−1) SSB groups other than the SSB group, in which the SSB corresponding to the received beam is located, is an SSB group to be transmitted, and the last (m−1) bits are used to indicate, in the SSBs to be transmitted, whether each of the (m−1) SSB other than the SSB corresponding to the receiving beam is an SSB to be transmitted, the first n−1 bits in the received configuration information are 0111101 and the last (m−1) bits are 1100111, the first bit of the first n−1 bits can be supplemented by 1 to obtain the first n bits 10111101, and the eighth bit of the last (m−1) bits can be supplemented by 1 to obtain the last m bits 11001111. Then parsing is performed based on the supplemented configuration information.

Figure 10:
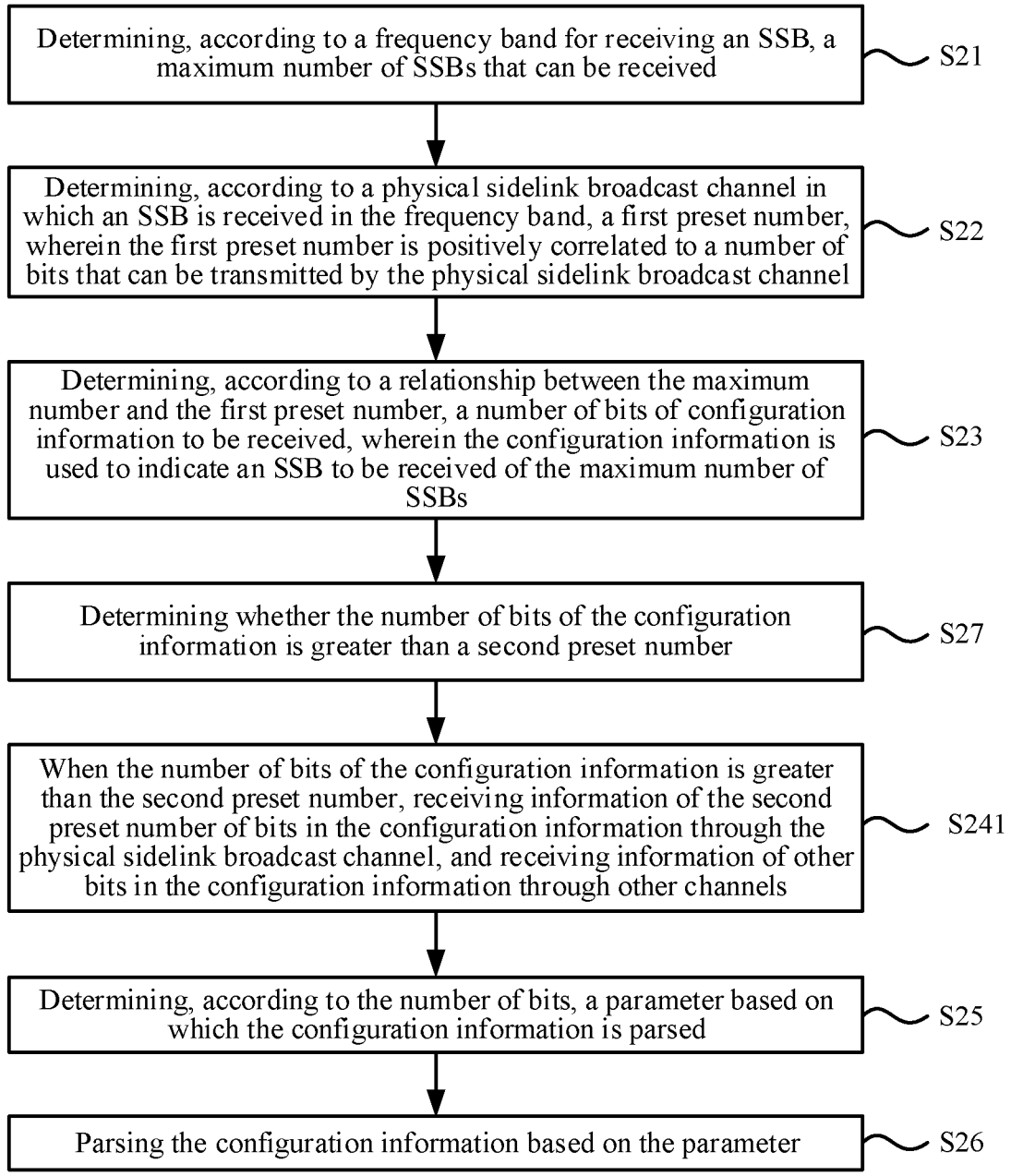
FIG. 10 is a schematic flowchart illustrating another method for receiving configuration information of an SSB according to an embodiment of the present disclosure.

FIG. 10 is a schematic flow diagram illustrating another sidelink communication method according to an embodiment of the present disclosure. As illustrated in FIG. 10, the method further includes the following steps.

In step S27, before receiving the configuration information through the physical sidelink broadcast channel, it is determined whether the number of bits of the configuration information is greater than a second preset number.

When the number of bits of the configuration information is greater than a second preset number, receiving the configuration information through the physical sidelink broadcast channel includes step S241.

In step S241, the information of a second preset number of bits in the configuration information is received through a physical sidelink broadcast channel, and the information of other bits in the configuration information is received through other channels.

In an embodiment, corresponding to the embodiment illustrated in FIG. 5, if the number of bits of the configuration information is greater than the second preset number, the vehicle serving as the base station may broadcast the information of the second preset number of bits in the configuration information through the physical sidelink broadcast channel, and transmit the information of other bits in the configuration information through other channels. Then the vehicle serving as the user equipment in this embodiment receives the information of the second preset number of bits in the configuration information through the physical sidelink broadcast channel, and receives the information of other bits in the configuration information through other channels.

Optionally, the SSBs in the SSB group correspond to the beams one by ones.

Optionally, multiple SSBs in the SSB group correspond to the same beam.

Corresponding to the foregoing embodiment of the sidelink communication method, the present disclosure further provides an embodiment of a sidelink communication device.

Figure 11:
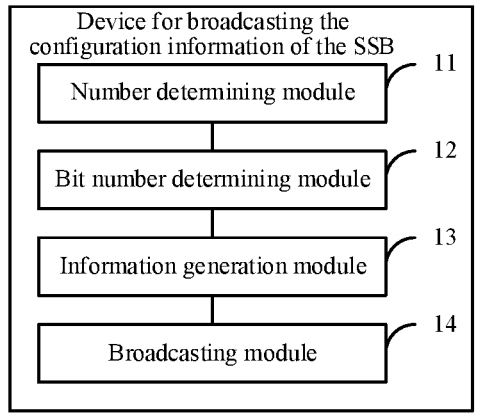
FIG. 11 is a schematic block diagram illustrating a device for broadcasting configuration information of an SSB according to an embodiment of the present disclosure.

FIG. 11 is a schematic block diagram illustrating a device for broadcasting the configuration information of an SSB according to an embodiment of the present disclosure. The device for broadcasting the configuration information of the SSB shown in the present embodiment may be applied to a device capable of serving as a base station in sidelink communication, for example, a vehicle capable of emulating the base station to transmit a signal through a beam, and this vehicle may communicate with other vehicles based on the 5G NR technology.

As shown in FIG. 11, the device for broadcasting configuration information of the SSB may include:

a number determining module 11, configured to determine a maximum number of the SSBs that can be transmitted according to a frequency band of the transmission SSB;

a bit number determining module 12, configured to determine a number of bits of the configuration information to be generated according to the relationship between the maximum number and the first preset number;

an information generation module 13, configured to generate configuration the information including the number of bits, herein the configuration information is used to indicate an SSB to be transmitted of the maximum number of SSBs, and the first preset number is positively correlated to the number of bits that can be transmitted by the physical sidelink broadcast channel;

a broadcasting module 14, configured to broadcast the configuration information through a physical sidelink broadcast channel.

Figure 12:
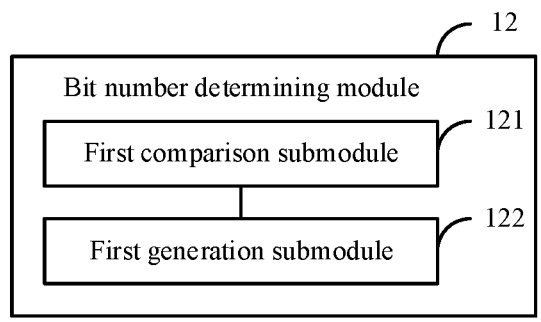
FIG. 12 is a schematic block diagram illustrating a bit number determining module according to an embodiment of the present disclosure.

FIG. 12 is a schematic block diagram illustrating a bit number determining module according to an embodiment of the present disclosure. As illustrated in FIG. 12, the bit number determining module 12 includes:

a first comparison submodule 121, configured to determine whether the maximum number is greater than the first preset number.

The first generation submodule 122 is configured to, when the maximum number is less than or equal to the first preset number, generate configuration information having the maximum number of bits. Herein each bit in the configuration information indicates whether an SSB is an SSB to be transmitted.

Figure 13:
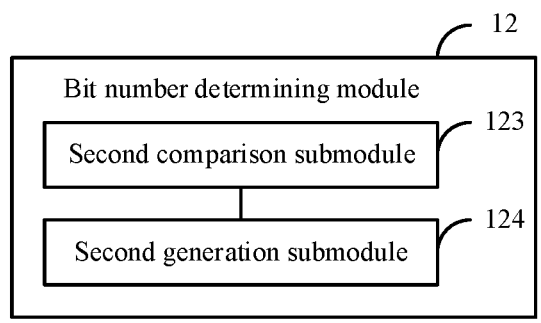
FIG. 13 is a schematic block diagram illustrating another bit number determining module according to an embodiment of the present disclosure.

FIG. 13 is a schematic block diagram illustrating another bit number determining module according to an embodiment of the present disclosure. As illustrated in FIG. 13, the maximum number of the SSBs includes n sync signal block groups, each SSB group includes m SSBs, herein m and n are positive integers, and the bit number determining module includes:

a second comparison submodule 123, configured to determine whether the maximum number is greater than the first preset number;

a second generation submodule 124, configured to, when the maximum number is greater than the first preset number, generate configuration information having n+m bits, herein n bits of the n+m bits are used to indicate whether each of the n SSB groups is an SSB group to be transmitted, and m bits of the n+m bits are used to indicate whether each of the SSB groups to be transmitted is an SSB to be transmitted.

Figure 14:
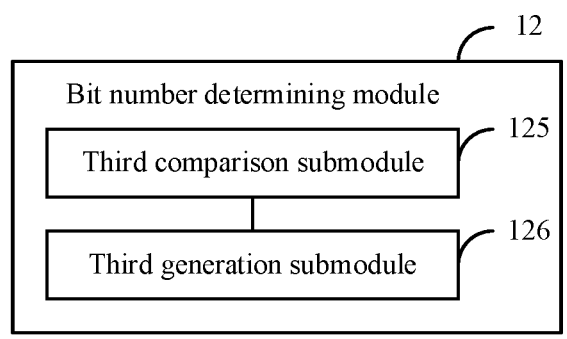
FIG. 14 is a schematic block diagram illustrating yet another bit number determining module according to an embodiment of the present disclosure.

FIG. 14 is a schematic block diagram illustrating another bit number determining module according to an embodiment of the present disclosure. As illustrated in FIG. 14, the maximum number of the SSBs includes n SSB groups, each SSB group includes m SSBs, herein m and n are positive integers, and the bit number determining module includes:

a third comparison submodule 125, configured to determine whether the maximum number is greater than the first preset number;

a third generation submodule 126, configured to, when the maximum number is greater than the first preset number, determine a transmission beam in which the configuration information is located, and generate configuration information having $(n-1)+(m-1)$ bits, herein $n-1$ bits of the $(n-1)+(m-1)$ bits are used to indicate whether each SSB group of $n-1$ SSB groups other than an SSB group, in which an SSB corresponding to the transmission beam is located, is an SSB group to be transmitted, and $m-1$ bits of the $(n-1)+(m-1)$ bits are used to indicate whether each of $m-1$ SSBs in the SSBs to be transmitted other than an SSB corresponding to the transmission beam is an SSB to be transmitted.

Figure 15:
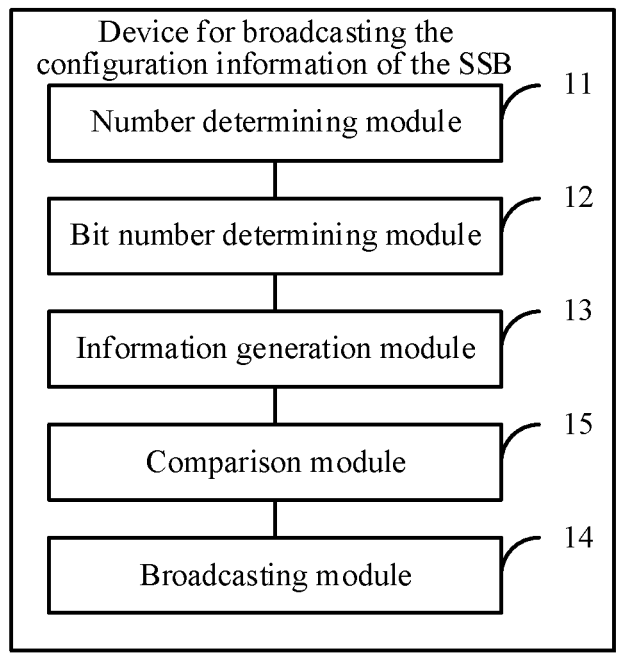
FIG. 15 is a schematic block diagram illustrating another device for broadcasting configuration information of an SSB according to an embodiment of the present disclosure.

FIG. 15 is a schematic block diagram illustrating another device for broadcasting the configuration information of the SSB according to an embodiment of the present disclosure. As illustrated in FIG. 15, the device further includes:

a comparison module 15, configured to, before broadcasting the configuration information through the physical sidelink broadcast channel, determine whether the number of bits of the configuration information is greater than a second preset number.

Herein the broadcasting module 14 is configured to, when the number of bits of the configuration information is greater than the second preset number, broadcast information of a second preset number of bits in the configuration information through a physical sidelink broadcast channel, and transmit information of other bits in the configuration information through other channels.

Optionally, the SSBs in the SSB group correspond to the beams one by one.

Optionally, multiple SSBs in the SSB group correspond to the same beam.

Figure 16:
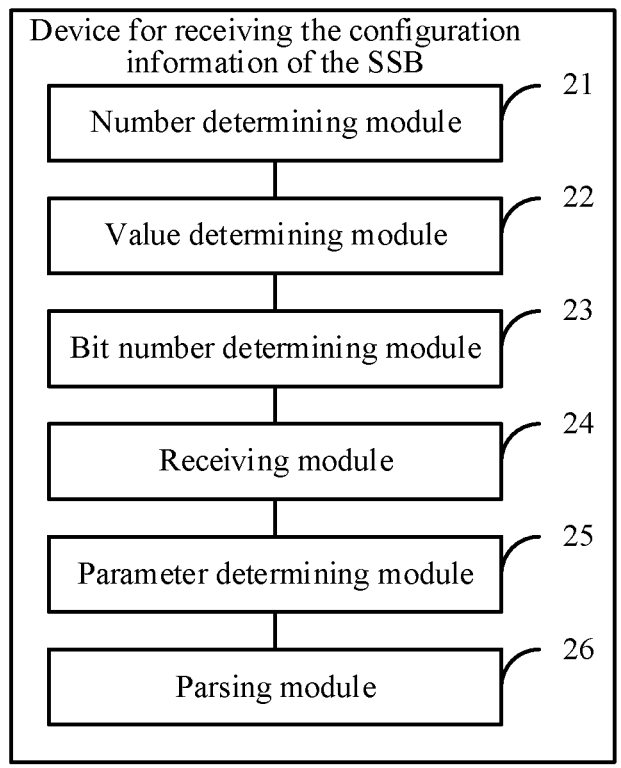
FIG. 16 is a schematic block diagram illustrating a device for receiving configuration information of an SSB according to an embodiment of the present disclosure.

FIG. 16 is a schematic block diagram illustrating a device for receiving configuration information of an SSB according to an embodiment of the present disclosure. The device for receiving the configuration information of the SSB shown in present embodiment may be applied to a vehicle capable of serving as a user equipment in sidelink communication, for example, a vehicle communicating with the vehicle serving as a base station in the embodiment illustrated in FIG. 11, this vehicle may receive information broadcasted by the vehicle serving as a base station in the embodiment illustrated in FIG. 11 based on the 5G NR technology.

As shown in FIG. 16, the device for receiving configuration information of the SSB may include:

a number determining module 21, configured to, according to a frequency band for receiving an SSB, determine a maximum number of the SSBs that can be received;

a value determining module 22, configured to determine the first preset number according to a physical sidelink broadcast channel in which an SSB is received in the frequency band, herein the first preset number is positively correlated to a number of bits that can be transmitted by the physical sildelink broadcast channel;

a bit number determining module 23, configured to, according to a relationship between the maximum number and the first preset number, determine a number of bits of the configuration information to be received, herein the configuration information is used to indicate an SSB to be received in the maximum number of the SSBs;

a receiving module 24, configured to receive the configuration information through a physical sidelink broadcast channel;

a parameter determining module 25, configured to, according to the number of bits, determine a parameter based on which the configuration information is parsed;

a parsing module 26, configured to parse the configuration information based on the parameter.

Figure 17:
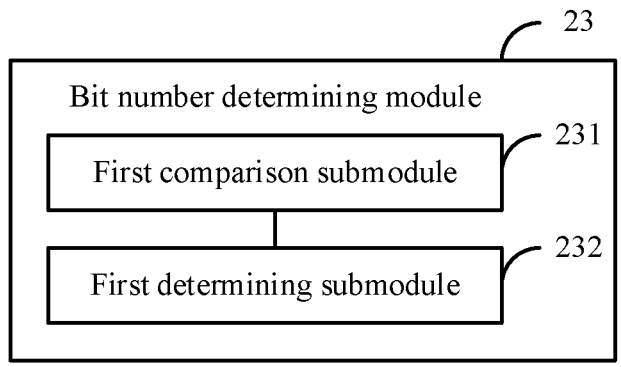
FIG. 17 is a schematic block diagram illustrating a bit number determining module according to an embodiment of the present disclosure.

FIG. 17 is a schematic block diagram illustrating a bit number determining module according to an embodiment of the present disclosure. As illustrated in FIG. 17, the bit number determining module 23 includes:

a first comparison submodule 231, configured to determine whether the maximum number is greater than the first preset number;

a first determining submodule 232, configured to, when the maximum number is less than or equal to the first preset number, determine to receive the configuration having the maximum number of bits, herein each bit in the configuration information indicates whether an SSB is an SSB to be received.

Figure 18:
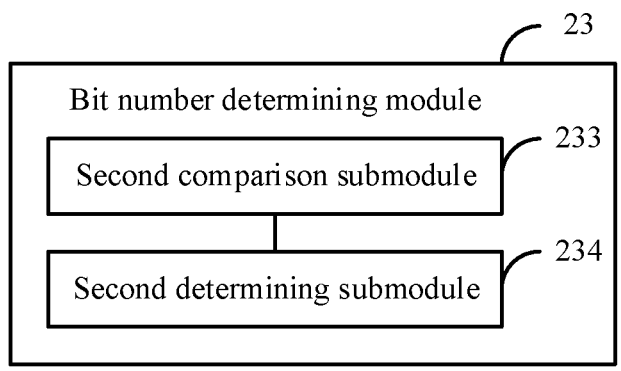
FIG. 18 is a schematic block diagram illustrating another bit number determining module according to an embodiment of the present disclosure.

FIG. 18 is a schematic block diagram illustrating another bit number determining module according to an embodiment of the present disclosure. As illustrated in FIG. 18, the maximum number of SSBs includes n SSB groups, each SSB group includes m SSBs, herein m and n are positive integers, and the bit number determining module 23 includes:

a second comparison submodule 233, configured to determine whether the maximum number is greater than the first preset number;

a second determining submodule 234, configured to, when the maximum number is greater than the first preset number, determine the configuration information having n+m bits, herein n bits of the n+m bits are used to indicate whether each of the n SSB groups is an SSB group to be received, and m bits of the n+m bits are used to indicate whether each SSB in the SSB groups to be received is an SSB to be received.

Figure 19:
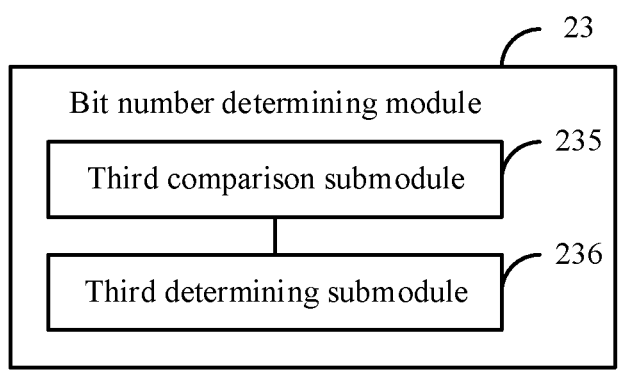
FIG. 19 is a schematic block diagram illustrating yet another bit number determining module according to an embodiment of the present disclosure.

FIG. 19 is a schematic block diagram illustrating another bit number determining module according to an embodiment of the present disclosure. As illustrated in FIG. 19, the maximum number of the SSBs includes n SSB groups, each SSB group includes m SSBs, herein m and n are positive integers, and the bit number determining module includes:

a third comparison submodule 235, configured to determine whether the maximum number is greater than the first preset number;

a third determining submodule 236, configured to, when the maximum number is greater than the first preset number, determine a receiving beam in which the configuration information is received, and determine to receive the configuration information having (n−1)+(m−1) bits, herein n−1 bits of the (n−1)+(m−1) bits are used to indicate whether each SSB group of n−1 SSB groups other than an SSB group, in which an SSB corresponding to the receiving beam is located, is an SSB group to be transmitted, and m−1 bits of the (n−1)+(m−1) bits are used to indicate whether each of m−1 SSBs in the SSBs to be transmitted other than the SSB corresponding to the receiving beam is an SSB to be transmitted.

Figure 20:
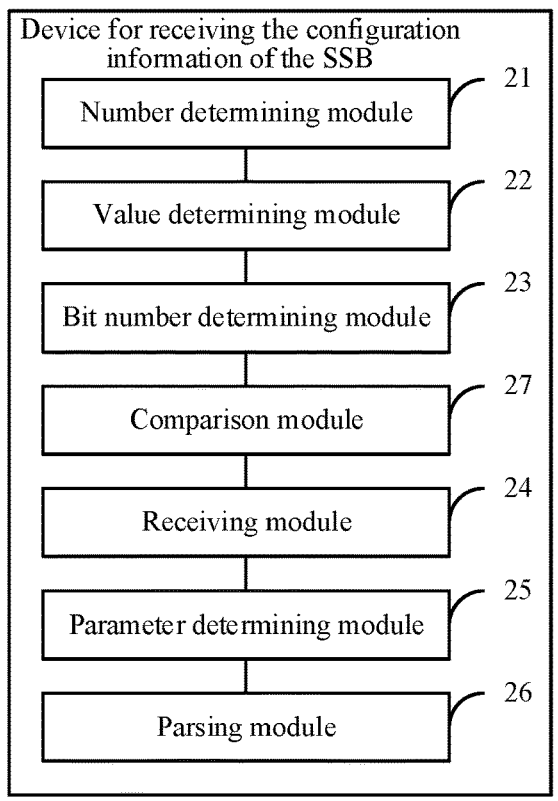
FIG. 20 is a schematic block diagram illustrating another device for receiving configuration information of an SSB according to an embodiment of the present disclosure.

FIG. 20 is a schematic block diagram illustrating another device for receiving the configuration information of the SSB according to an embodiment of the present disclosure. As illustrated in FIG. 20, the device further includes:

a comparison module 27, configured to, before receiving the configuration information through the physical sidelink broadcast channel, determine whether the number of bits=of the configuration information is greater than a second preset number.

Herein the receiving module 24 is configured to, when the number of bits of the configuration information is greater than a second preset number, receive the information of a second preset number of bits in the configuration information through a physical sidelink broadcast channel, and receive the information of other bits in the configuration information through another channel.

Optionally, the SSBs in the SSB group correspond to the beams one by one.

Optionally, multiple SSBs in the SSB group correspond to the same beam.

With respect to the devices in the above embodiments, the specific manner for performing operations for individual modules therein have been described in detail in the embodiments regarding the related method, which will not be elaborated herein.

With respect to the embodiments of devices, since it substantially corresponds to the embodiments of methods, reference can be made to the partial description of the embodiments of methods. The embodiments of device described above are merely illustrative, herein the elements illustrated as separate components may or may not be physically separate, and the components shown as elements may or may not be physical elements, i.e., may be located at one location, or may be distributed across multiple network elements. Some or all of the modules may be selected according to actual needs to achieve the objectives of the embodiments. Those skilled in the art will understand and implement without any inventive effort.

An embodiment of the present disclosure further provides an electronic device including:

a processor;

a memory for storing instructions executable by the processor.

Herein the processor is configured to implement the steps of the method of any of the embodiments in FIG. 1 to FIG. 5 described above.

An embodiment of the present disclosure further provides an electronic device including:

a processor;

a memory for storing instructions executable by the processor.

Herein the processor is configured to implement the steps in the method of any one of the embodiments illustrated in FIG. 6 to FIG. 10 described above.

An embodiment of the present disclosure also provides a computer readable storage medium having stored therein a computer program that, when executed by a processor, cause the processor to implement the steps in the method of any one of the embodiments in FIG. 1 to FIG. 5 described above.

An embodiment of the present disclosure also provides a computer readable storage medium having stored therein a computer program that, when executed by a processor, cause the processor to implements the steps in the method of any one of the embodiments in FIG. 6 to FIG. 10 described above.

Figure 21:
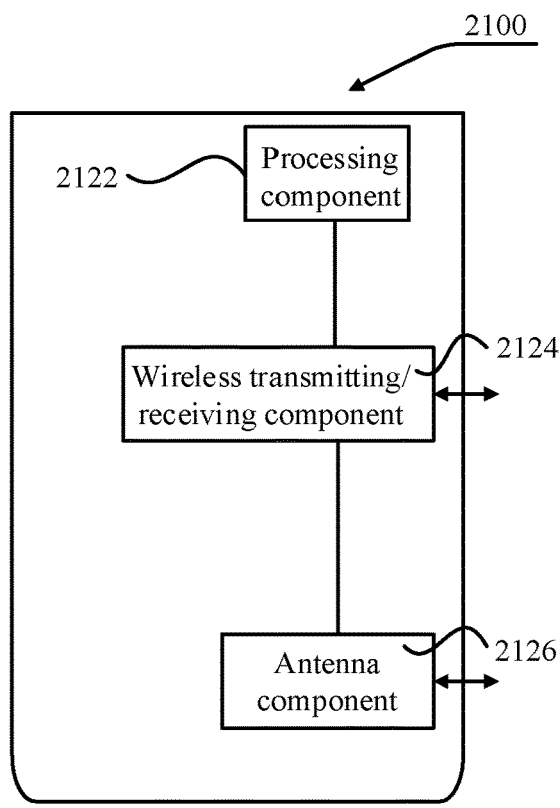
FIG. 21 is a schematic diagram illustrating the structure of a device for broadcasting configuration information of an SSB according to an embodiment of the present disclosure.

As illustrated in FIG. 21, FIG. 21 is a schematic diagram illustrating the structure of a device 2100 for broadcasting the configuration information of an SSB according to an embodiment of the present disclosure. Device 2100 may be provided as a base station. Referring to FIG. 21, device 2100 includes a processing component 2122, which may further include one or more processors, a wireless transmitting/receiving component 2124, an antenna component 2126, and a signal processing portion specific to the wireless interface. One processor of the processing component 2122 may be configured to implement the steps in the method in the embodiments illustrated in FIG. 1 to FIG. 5.

Figure 22:
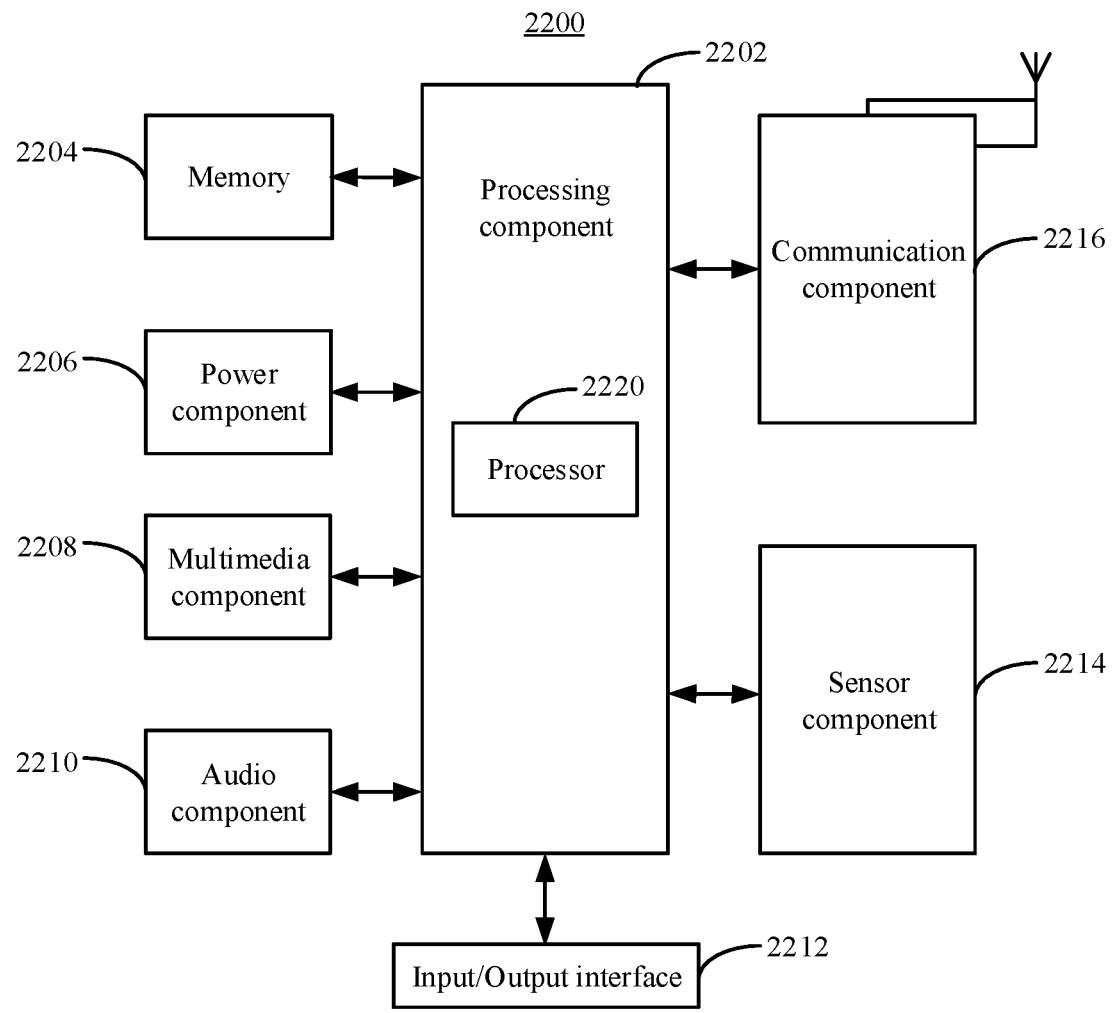
FIG. 22 is a schematic diagram illustrating the structure of a device for receiving configuration information of an SSB according to an embodiment of the present disclosure.

FIG. 22 is a schematic diagram illustrating the structure of a device 2200 for receiving the configuration information of an SSB according to an embodiment of the present disclosure. For example, the device 2200 may be a mobile phone, a computer, a digital broadcast terminal, a messaging device, a game console, a tablet device, a medical device, an exercise device, a personal digital assistant, or the like.

Referring to FIG. 22, the device 2200 may include one or more of the following component: a processing component 2202, a memory 2204, a power component 2206, a multimedia component 2208, an audio component 2210, an input/output (I/O) interface 2212, a sensor component 2214, and a communication component 2216.

The processing component 2202 typically controls overall operations of the device 2200, such as operations associated with displays, telephone calls, data communications, camera operations, and recording operations. The processing component 2202 may include one or more processors 2220 to execute instructions to perform all or part of the steps in the method described above. In addition, the processing component 2202 may include one or more modules which facilitate the interaction between the processing component 2202 and other components. For example, the processing component 2202 may include a multimedia module to facilitate interaction between the multimedia component 2208 and the processing component 2202.

The memory 2204 is configured to store various types of data to support the operation of the device 2200. Examples of such data include instructions for any applications or methods operated on the device 2200, contact data, phone book data, messages, pictures, video, etc. The memory 2204 may be implemented using any type of volatile or non-volatile memory device, or a combination thereof, such as static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or optical disk.

The power component 2206 provides power to various components of the device 2200. The power components 2206 may include a power management system, one or more power sources, and other components associated with the generation, management, and distribution power in the device 2200.

The multimedia component 2208 includes a screen providing an output interface between the device 2200 and the user. In some embodiments, the screen may include a liquid crystal display (LCD) and a touch panel (TP). If the screen includes a touch panel, the screen may be implemented as a touch screen to receive input signals from a user. The touch panel includes one or more touch sensors to sense touches, swipes, and gestures on the touch. The touch sensor may not only sense the boundary of a touch or sliding action, but also sense a period of time and a pressure associated with the touch or swipe operation. In some embodiments, the multimedia component 2208 includes a front camera and/or a rear camera. When the device 2200 is in an operating mode, such as a shooting mode or a video mode, the front camera and/or the rear camera may receive an external multimedia data. Each of the front and rear cameras may be a fixed optical lens system or have a focus and optical zoom capability.

The audio component 2210 is configured to output and/or input audio signals. For example, the audio component 2210 includes a microphone (MIC) configured to receive an external audio signal when the device 2200 is in an operating mode, such as a call mode, a recording mode, and a speech recognition mode. The received audio signal may be further stored in the memory 2204 or transmitted via communication component 2216. In some embodiments, the audio component 2210 further includes a speaker to output audio signal.

The I/O interface 2212 provides an interface between the processing component 2202 and the peripheral interface modules, such as a keyboard, a click wheel, a button, and the like. These buttons may include, but are not limited to, a home button, a volume button, a starting button, and a locking button.

The sensor assembly 2214 includes one or more sensors for providing status assessment of various aspects of the device 2200. For example, the sensor component 2214 may detect an open/closed status of the device 2200, relative positioning of the components, such as the display and keypad of the device 2200, a change in position of the device 2200 or a component of the device 2200, a presence or absence of user contact with the device 2200, an orientation or acceleration/deceleration of the device 2200, and a change in the temperature of the device 2200. The sensor component 2214 may include a proximity sensor configured to detect the presence of nearby objects without any physical contact. The sensor component 2214 may also include a light sensor, such as a CMOS or CCD picture sensor, for use in imaging applications. In some embodiments, the sensor component 2214 may also include an acceleration sensor, a gyroscope sensor, a magnetic sensor, a pressure sensor, or a temperature sensor.

The communication component 2216 is configured to facilitate communication, wired or wireless, between the device 2200 and other devices. The device 2200 may access a wireless network based on a communication standard, such as WI-FI, 2G or 3G, or a combination thereof. In one exemplary embodiment, communication component 2216 receives a broadcast signal or broadcast associated information from an external broadcast management system via a broadcast channel. In one exemplary embodiment, the communication component 2216 further includes a near field communication (NFC) module to facilitate short-range communication. For example, the NFC module may be implemented based on a Radio Frequency Identification (RFID) technology, an Infrared Data Association (IrDA) technology, am Ultra-Wideband (UWB) technology, a Bluetooth (BT) technology, and other technologies.

In an exemplary embodiment, device 2200 may be implemented with one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic components, for performing the steps in the method of any of the embodiments of FIG. 6 to FIG. 10 described above.

In an exemplary embodiment, there is also provided a non-temporary computer readable storage medium including instructions, such as included in the memory 2204, executable by the processor 2220 in the device 2200, for performing the above methods. For example, the non-transitory computer-readable storage medium may be a ROM, a random-access memory (RAM), a CD-ROM, a magnetic tape, a floppy disk, an optical data storage device, or the like.

Other embodiments of the disclosure will be apparent to those skilled in the art from consideration of the specification and practice of the disclosure disclosed here. This application is intended to cover any variations, uses, or adaptations of the present disclosure following the general principles thereof and including such departures from the present disclosure as common within known or customary practice in the art. It is intended that the specification and examples are to be regarded as exemplary only, with a true scope and spirit of the present disclosure being indicated by the following claims.

It is to be understood that the present disclosure is not limited to the exact construction that has been described above and illustrated in the accompanying drawings, and that various modifications and changes may be made without departing from the scope thereof. It is intended that the scope of the present disclosure only be limited by the appended claims.

It is to be noted that in present disclosure, the relational terms, such as first, second and the like, are only used to distinguish an entity or operation from another entity or operation, without necessarily requiring or implying any such actual relationship or order between these entities or operations. The terms "comprise" "include" or any other variation thereof, are intended to cover a non-exclusive inclusion, such that a process, a method, a product, or a device that including a series of elements includes not only those elements but also other elements not listed, or also includes elements inherent to such process, method, product, or device. Without more limitations, elements defined by the statement "include a . . . " do not exclude that there are additional identical elements in the process, method, product or device including the elements.

The methods and devices provided by the embodiments of the present disclosure have been described above in detail, and specific examples have been used herein to illustrate the principles and embodiments of the present disclosure. The above description of the embodiments is merely intended to help in understanding the methods of the present disclosure and the core concepts thereof. At the same time, variations in the detailed description and scope of the application will occur to those skilled in the art in light of the teachings of the present disclosure. In light of the foregoing, the present description is not to be construed as limiting the invention.

The invention claimed is:

1. A method for broadcasting configuration information of a Synchronization Signal Block (SSB), applied to sidelink communication, the method comprising:
  determining, according to a frequency band for transmitting an SSB, a maximum number of SSBs that can be transmitted;
    determining, according to a relationship between the maximum number and a first preset number, a number of bits of configuration information to be generated, generating configuration information comprising the number of bits, wherein the configuration information is used to indicate an SSB to be transmitted of the maximum number of SSBs, and the first preset number is positively correlated to a number of bits that can be transmitted via a physical sidelink broadcast channel; and
  broadcasting the configuration information through the physical sidelink broadcast channel;
  wherein the maximum number of SSBs comprises n SSB groups, each SSB group comprises m SSBs, wherein m and n are positive integers; and determining, according to the relationship between the maximum number and the first preset number, the number of bits of the configuration information to be generated, generating the configuration information comprising the number of bits comprises:
  determining whether the maximum number is greater than the first preset number; and
  when the maximum number is greater than the first preset number, determining a transmission beam in which the configuration information is located, and generating configuration information having (n−1)+(m−1) bits; wherein n−1 bits of the (n−1)+(m−1) bits are used to indicate whether each SSB group of n−1 SSB groups other than an SSB group, in which an SSB corresponding to the transmission beam is located, is an SSB group to be transmitted; and m−1 bits of the (n−1)+(m−1) bits are used to indicate whether each of m−1 SSBs in the SSBs to be transmitted other than the SSB corresponding to the transmission beam is an SSB to be transmitted.

2. The method of claim 1, wherein determining, according to the relationship between the maximum number and the first preset number, the number of bits of the configuration information to be generated, generating the configuration information comprising the number of bits comprises:
  determining whether the maximum number is greater than the first preset number; and
  when the maximum number is less than or equal to the first preset number, generating configuration information having the maximum number of bits, wherein each bit in the configuration information indicates whether an SSB is an SSB to be transmitted.

3. The method of claim 1, further comprising:
  determining, before broadcasting the configuration information through the physical sidelink broadcast channel, whether the number of bits of the configuration information is greater than a second preset number; and
  when the number of bits of the configuration information is greater than the second preset number, broadcasting the configuration information through the physical sidelink broadcast channel comprises:
  broadcasting information of the second preset number of bits in the configuration information through a physical sidelink broadcast channel, and transmitting information of other bits in the configuration information through other channels.

4. The method of claim 1, wherein SSBs in the SSB group correspond to beams one by one.

5. The method of claim 1, wherein a plurality of SSBs in the SSB group correspond to a same beam.

6. A method for receiving configuration information of a Synchronization Signal Block (SSB), applied to sidelink communication, the method comprising:
   determining, according to a frequency band for receiving an SSB, a maximum number of SSBs that can be received;
   determining, according to a physical sidelink broadcast channel in which an SSB is received in the frequency band, the first preset number, wherein the first preset number is positively correlated to a number of bits that can be transmitted by the physical sidelink broadcast channel;
   determining, according to a relationship between the maximum number and the first preset number, a number of bits of configuration information to be received, wherein the configuration information is used to indicate an SSB to be received in the maximum number of SSBs;
   receiving the configuration information through the physical sidelink broadcast channel;
   determining, according to the number of bits, a parameter based on which the configuration information is parsed; and
   parsing the configuration information based on the parameter;
   wherein the maximum number of SSBs comprises n SSB groups, each SSB group comprises m SSBs, wherein m and n are positive integers; and determining, according to the relationship between the maximum number and the first preset number, the number of bits of the configuration information to be received comprises:
   determining whether the maximum number is greater than the first preset number; and
   when the maximum number is greater than the first preset number, determining a receiving beam in which the configuration information is received, and determining to receive configuration information having (n−1)+(m−1) bits, wherein n−1 bits of the (n−1)+(m−1) bits are used to indicate whether each SSB group of n−1 SSB groups other than an SSB group, in which an SSB corresponding to the receiving beam is located, is an SSB group to be transmitted; and m−1 bits of the (n−1)+(m−1) bits are used to indicate whether each of m−1 SSBs in the SSBs to be transmitted other than the SSB corresponding to the receiving beam is an SSB to be transmitted.

7. The method of claim 6, wherein determining, according to the relationship between the maximum number and the first preset number, the number of bits of receiving the configuration information to be received comprises:
   determining whether the maximum number is greater than the first preset number; and
   when the maximum number is less than or equal to the first preset number, determining to receive configuration information having the maximum number of bits, wherein each bit in the configuration information indicates whether an SSB is an SSB to be received.

8. The method of claim 6, further comprising:
   determining, before receiving the configuration information through the physical sidelink broadcast channel, whether the number of bits of the configuration information is greater than a second preset number; and
   when the number of bits of the configuration information is greater than the second preset number, receiving the configuration information through the physical sidelink broadcast channel comprises:
   receiving information of the second preset number of bits in the configuration information through the physical sidelink broadcast channel, and receiving information of other bits in the configuration information through other channels.

9. The method of claim 6, wherein SSBs in the SSB group correspond to beams one by one.

10. The method of claim 6, wherein a plurality of SSBs in the SSB group correspond to a same beam.

11. A device for broadcasting configuration information of a Synchronization Signal Block (SSB), applied to sidelink communication, the device comprising:
    a processor;
    a memory for storing instructions executable by the processor;
    wherein the processor is configured to execute the instructions to:
    determine, according to a frequency band for transmitting an SSB, a maximum number of SSBs that can be transmitted;
    determine, according to a relationship between the maximum number and a first preset number, a number of bits of configuration information to be generated;
    generate configuration information comprising the number of bits, wherein the configuration information is used to indicate an SSB to be transmitted of the maximum number of SSBs, and the first preset number is positively correlated to a number of bits that can be transmitted via a physical sidelink broadcast channel; and
    broadcast the configuration information through the physical sidelink broadcast channel;
    wherein the maximum number of SSBs comprises n SSB groups, each SSB group comprises m SSBs, wherein m and n are positive integers; and the processor is configured to execute the instructions to:
    determine whether the maximum number is greater than the first preset number; and
    when the maximum number is greater than the first preset number, determine a transmission beam in which the configuration information is located, and generate configuration information having (n−1)+(m−1) bits, wherein n−1 bits of the (n−1)+(m−1) bits are used to indicate whether each SSB group of n−1 SSB groups other than an SSB group, in which an SSB corresponding to the transmission beam is located, is an SSB group to be transmitted; and m−1 bits of the (n−1)+(m−1) bits are used to indicate whether each of m−1 SSBs in the SSBs to be transmitted other than the SSB corresponding to the transmission beam is an SSB to be transmitted.

12. The device of claim 11, wherein the processor is further configured to execute the instructions to:
    determine whether the maximum number is greater than the first preset number; and
    when the maximum number is less than or equal to the first preset number, generate configuration information having the maximum number of bits, wherein each bit in the configuration information indicates whether an SSB is an SSB to be transmitted.

13. The device according to claim 11, wherein the processor is configured to execute the instructions to:
- before broadcasting the configuration information through the physical sidelink broadcast channel, determine whether the number of bits of the configuration information is greater than a second preset number; and
- when the number of bits of the configuration information is greater than the second preset number, broadcast information of the second preset number of bits in the configuration information through the physical sidelink broadcast channel, and transmit information of other bits in the configuration information through other channels.

14. The device according to claim 11, wherein SSBs in the SSB group correspond to beams one by one, or a plurality of SSBs in the SSB group correspond to a same beam.

\* \* \* \* \*